United States Patent
Voskuil (10) Patent No.: US 9,494,240 B2
(45) Date of Patent: *Nov. 15, 2016

(54) VALVE ASSEMBLY FOR A DISPENSER FOR FLUIDS

(75) Inventor: Marcus Johannes Voskuil, Oegstgeest (NL)

(73) Assignee: Fast & Fluid Management B.V., Sassenheim (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/978,650

(22) PCT Filed: Dec. 9, 2011

(86) PCT No.: PCT/EP2011/072376
§ 371 (c)(1),
(2), (4) Date: Jul. 8, 2013

(87) PCT Pub. No.: WO2012/093021
PCT Pub. Date: Jul. 12, 2012

(65) Prior Publication Data
US 2013/0277594 A1    Oct. 24, 2013

Related U.S. Application Data

(63) Continuation-in-part of application No. 12/986,273, filed on Jan. 7, 2011, now abandoned.

(51) Int. Cl.
*F16K 1/34* (2006.01)
*B01F 13/10* (2006.01)
(Continued)

(52) U.S. Cl.
CPC ............. *F16K 1/34* (2013.01); *B01F 13/1058* (2013.01); *F16K 31/52433* (2013.01); *F04B 53/1092* (2013.01); *Y10T 137/7843* (2015.04)

(58) Field of Classification Search
CPC .............. F04B 53/1092; F04B 53/1095; F16K 1/443; F16K 1/34; F16K 31/52433;
(Continued)

(56) References Cited

U.S. PATENT DOCUMENTS 1,734,292 A * 11/1929 Gonzalez ................ F04B 41/04
112/256
2,138,988 A * 12/1938 Thomas ................ F17C 13/045
137/512.5
(Continued)

FOREIGN PATENT DOCUMENTS

DE      716469 C      1/1942
EP      1688652 A1    8/2006
(Continued)

OTHER PUBLICATIONS

International Preliminary Report on Patentability for Corresponding PCT Apllication No. PCT/EP2011/072376, report dated Dec. 18, 2012.

*Primary Examiner* — Frederick C Nicolas
*Assistant Examiner* — Bob Zadeh
(74) *Attorney, Agent, or Firm* — Miller, Matthias & Hull LLP (57) ABSTRACT

A valve assembly for a dispenser for fluids including: a housing having at least an inlet opening and an outlet opening and a further opening connected or connectable to a fluid displacement mechanism, and a valve member including two parts translatably disposed within the housing, a first part for closing and opening the inlet and a second part for opening and closing the outlet.

12 Claims, 6 Drawing Sheets

(51) Int. Cl.
*F16K 31/524* (2006.01)
*F04B 53/10* (2006.01)

(58) Field of Classification Search
CPC .......................... F16K 1/36; F16K 1/44; Y10T
137/7843; B01F 13/1058; Y10S
137/904; Y10S 251/902
USPC ............. 222/144, 144.5, 380, 504; 141/258;
137/512.5, 522, 523, 903; 251/83;
417/443, 510, 518
See application file for complete search history.

(56) References Cited

U.S. PATENT DOCUMENTS

| | | | | | |
|---|---|---|---|---|---|
| 2,189,129 | A | * | 2/1940 | Bridwell | .................... F16K 1/40 137/512.1 |
| 2,634,743 | A | * | 4/1953 | Audemar | ................ F15B 7/003 137/112 |
| 2,888,034 | A | * | 5/1959 | Glegg | ................ F04B 53/1092 137/512.4 |
| 3,118,390 | A | * | 1/1964 | Kinsley | ................ F16K 11/166 137/625.48 |
| 3,162,336 | A | * | 12/1964 | Erickson | ....................... 222/309 |
| 3,369,564 | A | | 2/1968 | Puccinelli et al. | |
| 3,715,060 | A | * | 2/1973 | Benson | ................ A47G 19/183 222/207 |
| 3,805,825 | A | * | 4/1974 | Lovingham | ........... F16K 11/105 137/512 |
| 3,979,998 | A | * | 9/1976 | Wada | .................... F15B 15/224 91/26 |
| 4,258,759 | A | * | 3/1981 | Achen | ........................... 141/100 |
| 4,368,752 | A | * | 1/1983 | Tamamori | ............. F16K 11/105 137/112 |
| 6,336,572 | B1 | * | 1/2002 | Fujikawa et al. | ............. 222/380 |
| 6,371,160 | B2 | * | 4/2002 | Dettmann | ................ 137/596.17 |
| 7,086,413 | B2 | * | 8/2006 | Yu | .......................... B62D 5/062 137/493 |
| 2012/0175385 | A1 | * | 7/2012 | Voskuil | ............. F16K 31/52433 222/144 |
| 2013/0277594 | A1 | * | 10/2013 | Voskuil | .................... F16K 1/34 251/324 |
| 2014/0034674 | A1 | * | 2/2014 | Engels | ................ B01F 7/00216 222/135 |

FOREIGN PATENT DOCUMENTS

| | | | | |
|---|---|---|---|---|
| FR | 2933761 | A3 | 1/2010 | |
| IT | EP 2322828 | B1 * | 7/2013 | ....... F16K 31/52433 |
| SE | CH 499305 | A * | 11/1970 | ........... A47K 5/1208 |

* cited by examiner

VALVE ASSEMBLY FOR A DISPENSER FOR FLUIDS

CROSS-REFERENCE TO RELATED APPLICATIONS

This application is a 35 USC §371 U.S. national stage filing of International Patent Application No. PCT/EP2011/072376 filed on Dec. 9, 2011, which is a continuation of U.S. patent application Ser. No. 12/986,273, filed on Jan. 7, 2011.

BACKGROUND

1. Field of the Disclosure

The invention relates to a valve assembly for a dispenser for fluids comprising a housing having at least an inlet opening and an outlet opening and a further opening connected or connectable to a fluid displacement mechanism, e.g. a piston pump, and a valve member disposed within the housing. The invention also relates to an apparatus for dispensing fluids comprising a plurality of such valve assemblies.

2. Background of the Disclosure

EP 1 688 652 relates to a valve assembly comprising a housing and a valve member mounted within the housing rotatable about an axis and between at least a dispensing position and a further position, for instance a volume selection position during which a material can be withdrawn from a container, and, preferably, a seat for mounting and guiding the valve member within the housing, wherein at least one of said housing, valve member, and seat is made of a synthetic material and the assembly further comprises a spring, which urges at least two of said housing, valve member, and seat together.

WO 02/14726 discloses a valve assembly comprising a "valve enclosure body 10 having at least a first and a second outlet 11, 12 for liquid flowing through the valve. The valve construction . . . is intended especially for use in liquid dispensing devices, in which case the first outlet 11 . . . leads to a liquid container through a suction pipe, for instance, and the second outlet 12 is connected to liquid dispensing through a nozzle pipe, for instance. The vertical outlet in the figure connects to a plunger pump in the dispensing device . . . . A valve element 13 is located in the valve enclosure 10 and moves between two extreme positions. In one extreme position, the valve element 13 closes the first outlet 11 and in the second extreme position, it closes the second outlet 12."

U.S. Pat. No. 3,369,564 relates to a three-port valve having a valve member for controlling two of the ports so that when one of the two ports is closed the other is open.

FR 2 933 761 relates to a change valve comprising a "valve base (3)" similar to the valve member in U.S. Pat. No. 3,369,564.

It is an object of the present invention to provide valve assembly for dispensing fluids that allows more cost effective manufacture, in particular by inherently allowing wider tolerances.

SUMMARY OF THE DISCLOSURE

To this end, the valve member comprises two parts translatably disposed within the housing, a first part for closing and opening the inlet and a second part for opening and closing the outlet.

The parts are resiliently biased apart and into closing abutment with the inlet and outlet openings, e.g. by means of an elastic element, such as a spring, positioned between the first and second parts of the valve member. In an aspect, a resilient seat is provided at the interface between at least one of the parts and the opening it closes.

Using two translating parts enables a relatively straightforward design and avoidance of a so-called tolerance stack, e.g. by including one or more resilient elements between the parts and/or between one or both of the parts and the inlet and outlet openings. Also, if the valve parts and housing are made of a polymer, the resilient elements, in particular the spring between the valve parts, will compensate for creep.

In an aspect, the valve assembly comprises an operating element extending through the wall of the housing and coupled to the first and second parts of the valve member. In a further aspect, the operating element provides at least three positions, a first position wherein both parts are in closing abutment with respective openings, a second position wherein the first part of the valve member is withdrawn from the inlet and the second parts closes the outlet, and a third position wherein the second part of the valve member is withdrawn from the outlet and the first part closes the inlet.

In a further aspect, the parts and/or the inner wall of the housing are provided with guides, such as fins or ribs extending in axial direction, supporting translating motion of the parts and defining openings or channels that allow the fluid to flow from the inlet to the displacement mechanism and from the displacement mechanism to the outlet.

In a further aspect, at least one of the parts comprises a portion that, during intake of fluid, substantially closes off or at least obstructs fluid flow directly from the inlet opening to the fluid displacement mechanism and guides fluid flow towards and preferably beyond its end remote from the inlet opening.

The invention further relates to an apparatus for dispensing a plurality of fluids, comprising a support, such as a turntable or a linear table, a plurality of containers for holding a fluid and mounted on the support, and pumps and valve assemblies as described above connected to respective containers.

In an aspect, at least some, preferably all, of the pumps are located below the container and/or extend at least substantially horizontally. The valve assemblies provide a reliable seal between the container and the pump and a reduced risk of leaking due to hydrostatic pressure in the container, thus allowing the specified location which in turn facilitates operating the valves and pumps by means of an internal central actuator.

Within the framework of the invention, the term "fluid" is defined as any material that can flow and that can be dispensed by the apparatus according to the present invention. Examples of fluids include liquids, pastes, granulates, and powders.

The drawings are not necessarily to scale and details, which are not necessary for understanding the present invention, may have been omitted. Terms such as "upward", "downward", "upper" and "lower" merely refer to the orientations shown in the drawings.

DETAILED DESCRIPTION OF THE DISCLOSURE

Figure 1:
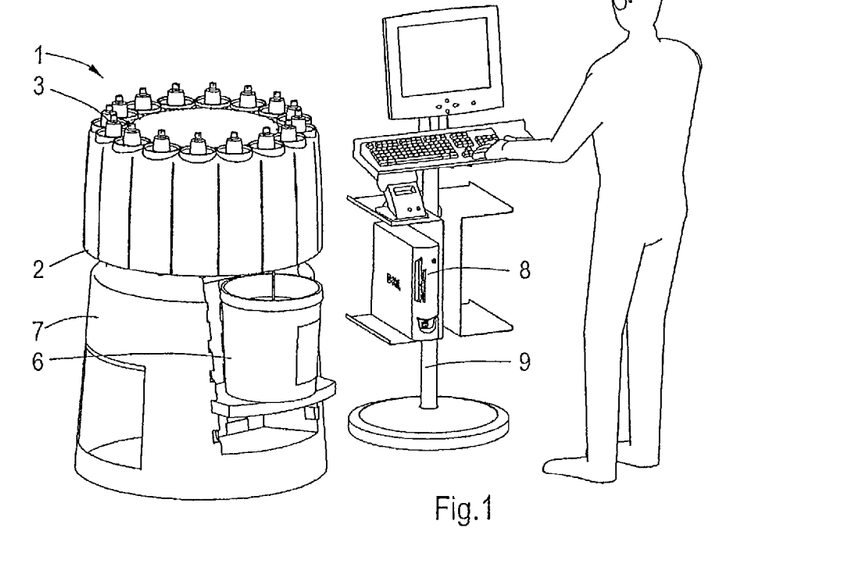
FIG. 1 is a perspective view of an apparatus for dispensing fluids according to the present invention in conjunction with an external computer system.
Figure 2A:
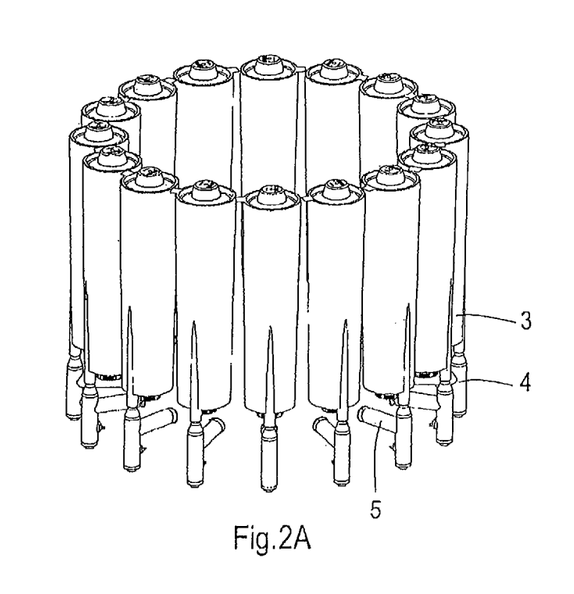
FIGS. 2A and 2B are perspective views of sub-assemblies of a container, a valve, and a pump as used in the apparatus shown in FIG. 1.
Figure 2B:
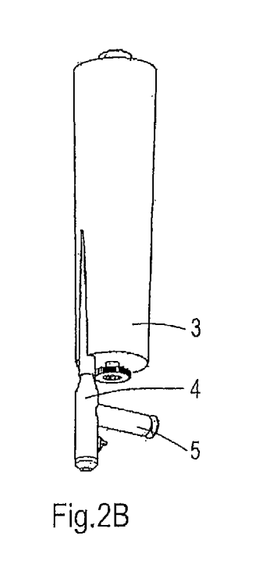

FIGS. 1, 2A, and 2B show an example of an apparatus 1 for dispensing a plurality of fluids, such as (components of) paints, paint colorants, hair dyes, shampoos, foundations, and the like. It can be used for dispensing numerous recipes and formulas of the said products and can be located e.g. at a retailer of decorative paints, a hairdresser, or a spa, respectively.

This particular dispensing apparatus 1 is an automated version and includes a horizontal turntable 2, with a plurality of containers 3 mounted along its circumference (FIG. 2A). Each container 3 is provided with a dispense valve assembly 4 and pump 5 (FIGS. 2A and 2B). The turntable 2 can be rotated between discrete positions, e.g. twelve or sixteen positions including a dispensing position, i.e. the position where the valves 4 and pumps 5 are operated by means of a central actuator and fluids are dispensed in a receptacle, in this example a bucket 6.

The apparatus 1 includes a base 7 made of e.g. a polymer and by injection moulding. A computer 8 for entering and storing information, such as customer data and recipes, and generating instructions for driving the turntable 2, valves 4 and pumps 5 is positioned on a separate stand 9.

Further details regarding suitable turntables and procedures for driving the various components, are disclosed in, for instance, international application WO 03/083334, European patent application 0 992 450, and European patent application 0 800 858.

Figures 3A, 3B, 3C:
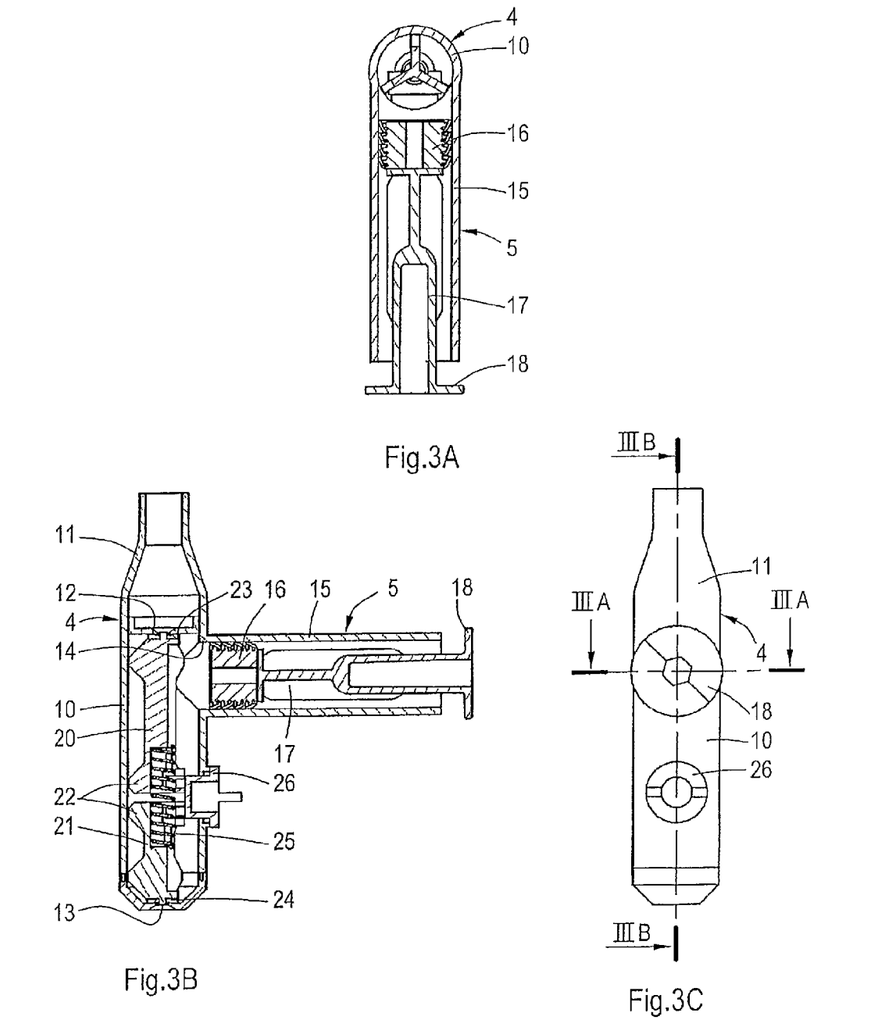
FIGS. 3A to 3C are cross-sections and a side view of a valve and pump according to the present invention, with the valve closed.

As shown in FIGS. 3A to 3C, each valve assembly 4 comprises a housing 10 having a cylindrical or conical top section 11 with which the valve assembly 4 can be fitted in an outlet opening in or near the bottom of a container 3. The housing 10 further has an inlet opening 12 in or near its top section 11, an outlet opening 13 in or near its bottom, and a further opening 14 in is side wall, which opening 14 communicates with a pump 5. In this example, the pump 5 comprises a cylinder 15 forming an integral part of the housing 10 and a piston 16 and piston rod 17 mounted inside the cylinder 15. The piston rod 17 is provided, on its end remote from the piston 16, with a washer or flange 18.

A valve member is translatably disposed within the housing 10. The valve member comprises two parts, a first part 20 for closing and opening the inlet 12 and a second part 21 for opening and closing the outlet 13. The housing 10 is cylindrical and the valve parts 12, 13 have a star-shaped cross-section (FIG. 3A) that, on the one hand, provides guides 22 that support translating motion of the valve parts 20, 21 within the housing 10 and prevent the valve parts 20, 21 from tilting and that, on the other hand, define channels to allow the fluid to flow from the inlet 12 to the pump 5 (along the upper valve part) and from the pump 5 to the outlet 13 (along the lower valve part). To reduce friction of the valve parts 20, 21 within the housing 10, each part abuts the inner wall of the housing on just two axial levels.

Each of the parts 20, 21 is provided, at its end facing the respective opening 12, 13, with a resilient seat 23, 24, made of e.g. silicone or a (fluoro)elastomer such as Viton™. Further, the valve parts 20, 21 are resiliently biased apart and into closing abutment with the inlet and outlet openings 12, 13 by means of a helical spring 25 positioned between the first and second parts 20, 21 of the valve member. A helical spring provides suitable stiffness and stroke as well as an open structure that adds little of no resistance to the flow of fluid within the housing.

Finally, the valve assembly comprises an operating element, e.g. a handle, lever, or, in this example, a rotary knob 26 extending through the wall of the housing 10 and coupled to the first and second parts 20, 21 of the valve member.

Figure 4A:
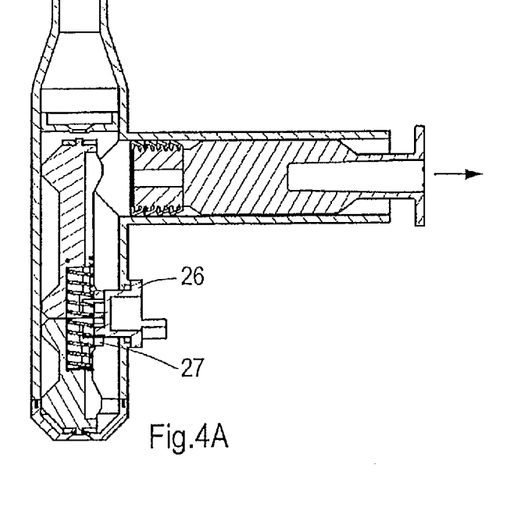
FIGS. 4A and 4B are cross-sections of the valve in its intake position.
Figure 4B:
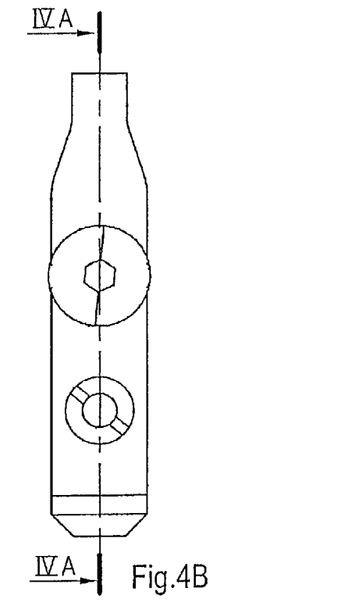
Figure 5A:
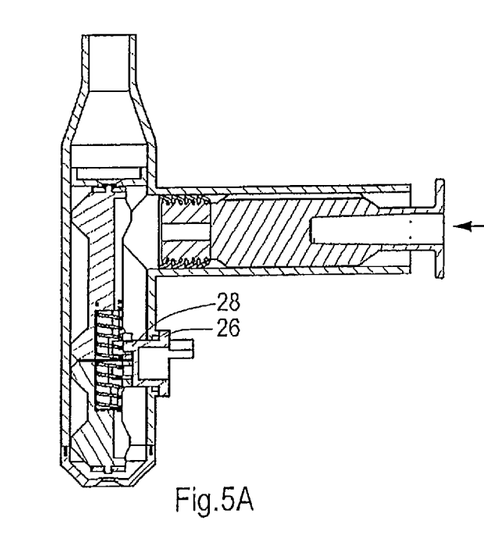
FIGS. 5A and 5B are cross-sections of the valve in its dispense position.
Figure 5B:
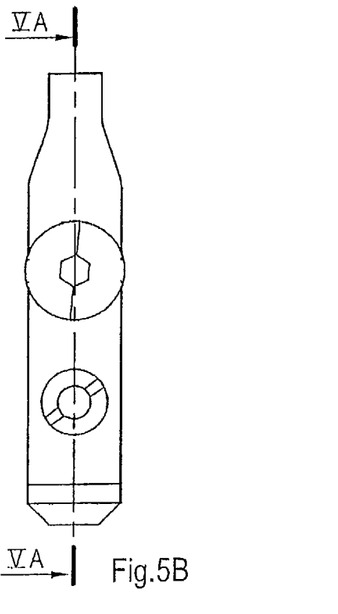

The rotary knob 26 provides three positions, a first or closed position wherein both the inlet opening and the outlet opening are closed by the valve parts (FIGS. 3A to 3C), a second or intake position wherein the first part of the valve member is withdrawn from the inlet and the second part closes the outlet (FIGS. 4A and 4B) and a third or dispense position wherein the second part of the valve member is withdrawn from the outlet and the first part closes the inlet (FIGS. 5A and 5B).

Further, in this example, the rotary knob 26 comprises, on its distal face two eccentric protrusions 27, 28 that cooperate with straight slots on the valve parts 20, 21. The slots extend in a direction perpendicular to the direction of translation of the valve parts and have a width that exceeds the diameter of the eccentric protrusions. If the rotary knob 26 is rotated clockwise the upper protrusion 28 pulls the upper valve part downwards and the lower protrusion 27 clears the lower valve part. If the rotary knob 26 is rotated counterclockwise the lower protrusion 28 pulls the lower valve part upwards and the upper protrusion 27 clears the upper valve part.

Figure 6:
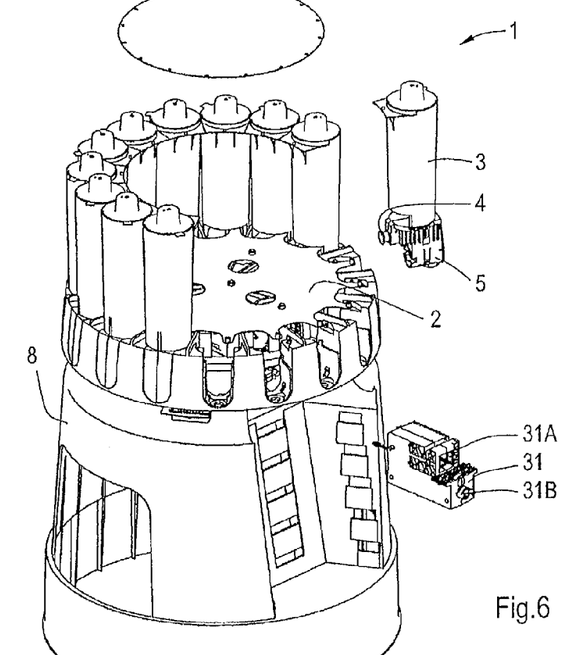
FIG. 6 is a perspective view of a further apparatus for dispensing fluids according to the present invention.

FIG. 6 shows a second example of an apparatus 1 for dispensing a plurality of fluids. Similar to the apparatus shown in FIGS. 1 to 5B, this dispensing apparatus 1 is an automated version including a horizontal turntable 2, with a plurality of containers 3 mounted along its circumference. Each container 3 is provided with a pump 4 and a dispense valve 5.

A swappable module 31 is located beneath the turntable and within the ring of containers and pumps. The module comprises a housing accommodating actuators 31A, 31B for operating respectively the pump 4 and the valve 5 of the container 3 at the dispensing position. The motors and gears for driving the turntable and the stirring elements within the containers are located in the turntable, outside the module and in a manner known in itself, e.g. from EP 800 858.

Figure 7:
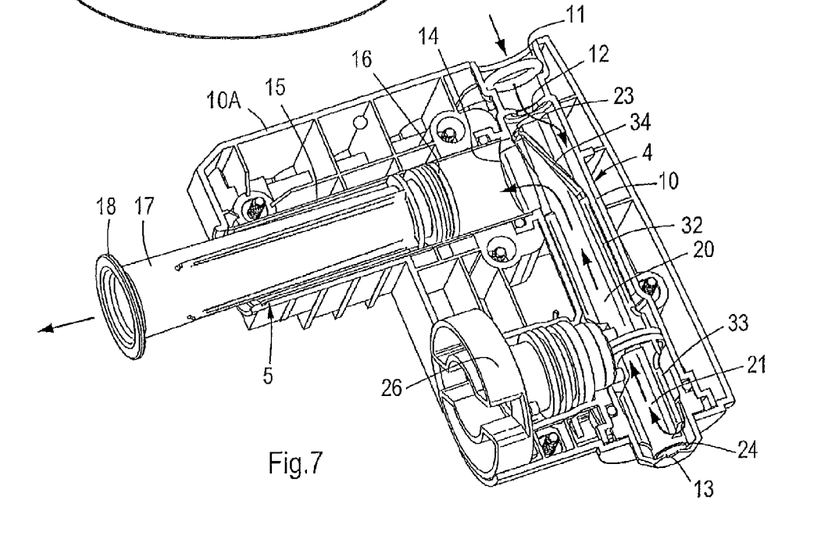
FIG. 7 is a perspective view of the valve and pump in the sub-assemblies as used in the apparatus shown in FIG. 6.
Figure 8:
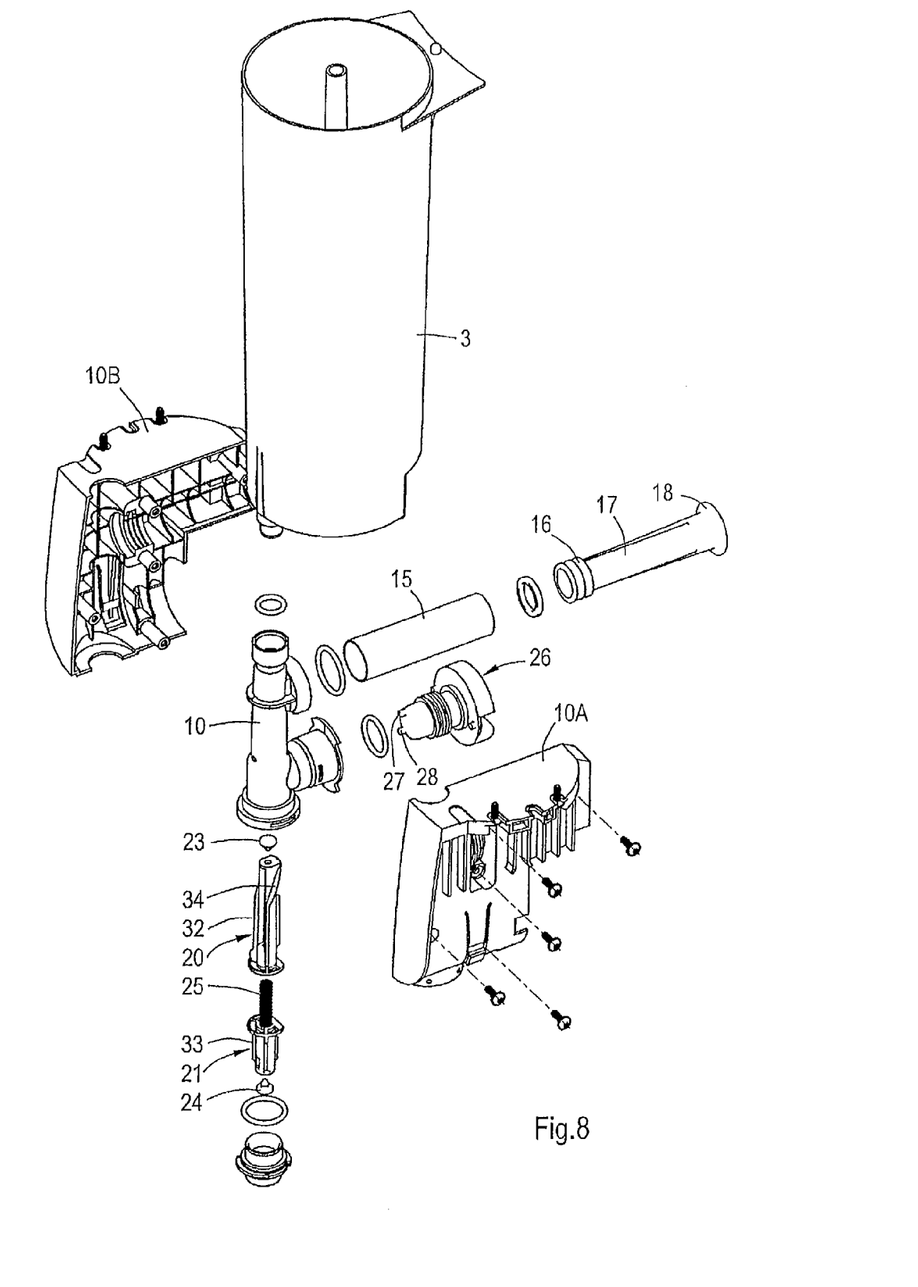
FIG. 8 is an exploded view of the valve and pump shown in FIG. 7.

As shown in FIGS. 7 and 8, each valve assembly 4 comprises a housing 10 accommodated in shells 10A, 10B and having an inlet opening 12 in or near its top section 11, an outlet opening 13 in or near its bottom, and a further opening 14 in its side wall, which opening 14 communicates with a pump 5. In this example, the pump 5 comprises a cylinder 15, e.g. made of metal, fitted to the housing 10 and in the shells 10A, 10B and a piston 16 and piston rod 17 mounted inside the cylinder 15. The piston rod 17 is provided, on its end remote from the piston 16, with a washer or flange 18.

A valve member is translatably disposed within the housing 10. The valve member comprises two parts, a first part 20 for closing and opening the inlet 12 and a second part 21 for opening and closing the outlet 13. The housing 10 is substantially cylindrical and the valve parts 12, 13 comprise laterally protruding walls 32, 33 running the length of respective parts 20, 21. These walls, on the one hand, serve as guides that support translating motion of the valve parts 20, 21 within the housing 10 and, on the other hand, define channels to allow the fluid to flow from the inlet 12 to the pump 5 and from the pump 5 to the outlet 13.

The valve parts 20, 21 are resiliently biased apart and into closing abutment with the inlet and outlet openings 12, 13 by means of a helical spring 25 positioned between the first and second parts 20, 21 of the valve member.

Finally, the valve assembly shown in FIGS. 6 to 8 comprises an operating element, e.g. a handle, lever, or, in this example, a rotary knob 26, similar in function to the one described above.

In the intake position of the knob and the valve parts, the pump communicates with a container and is filled with a desired amount of the fluid from the container by pulling the flange 18 and thus the piston 16 away from the valve over a desired or predetermined length by means of a central actuator.

As soon as a selected amount of fluid has been taken in, the knob is rotated, via the closed position, to the dispense position. In this position, the pump communicates with the dispense outlet in the bottom surface of the pump housing and the fluid is dispensed by pushing the flange and thus the piston towards the valve.

In the embodiment shown in FIGS. 6 to 8, the laterally protruding walls 32 on the valve part 20 comprise inclined portions 34 located at or overlapping the same axial position as the pump 5. The inclined portions 34 substantially close off or at least obstruct fluid flow directly from the inlet 12 to the pump 5 and guide fluid flow towards and preferably beyond the end of the valve party 20 remote from the inlet opening 12. Further, in this example, the laterally protruding walls 33 on the part 21 closing the outlet opening 13 facilitate fluid flow towards the (closed) outlet 13 and turning the fluid flow towards the pump 5. Thus, with each intake stroke of the pump, the entire or most of the volume of the valve is flushed, which process is indicated by arrows in FIG. 7, and segregation of the components in the fluid is avoided or at least reduced.

In the configurations described above, the direction of translation of the first and second valve parts and the direction of the resilient bias are aligned and are normal (i.c. perpendicular) to the area defined by the inlet and outlet openings. The spring and the resilient seats compensate variations in the dimension of the housing and the valve parts and thus inherently allow relatively wide tolerances, i.e. no high precision parts are required, and provide improved reliability.

As a matter of course, this disclosure is not restricted to the above-disclosed embodiments, which may be varied in different manners within the spirit and scope of the invention. For example, although it is preferred that the first and second valve parts are separate (detached) parts, the parts could instead be telescopically coupled or indeed resiliently attached.

Figure 9A:
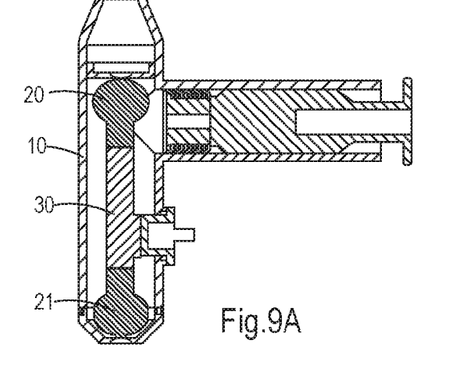
FIGS. 9A to 9C are cross-sections of a further example of a valve and pump according to the present invention.
Figure 9B:
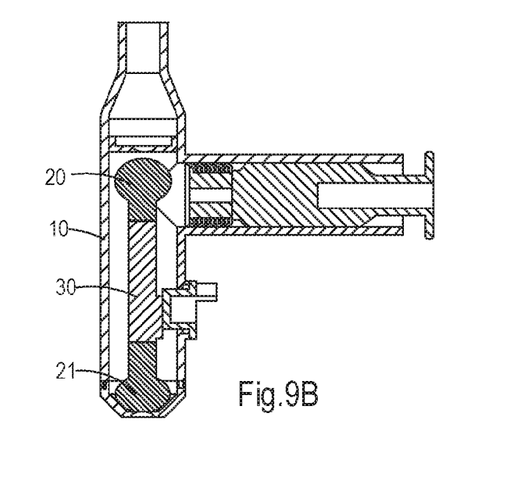
Figure 9C:
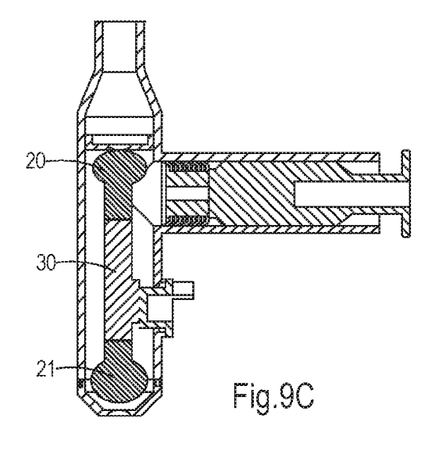

In the embodiment shown in FIGS. 9A to 9C, the first and second valve parts 20, 21 are made of a resilient material, e.g. an elastomer, such as Viton™. A rigid element, e.g. a rod 30 made of a non-elastomeric polymer, such as PET or PEEK, or a metal, such as aluminum, is positioned between the parts 20, 21. In this example, the valve parts are attached to the rod yielding an overall length that exceeds the length of the cavity defined by the housing. Thus, in the closed position, both the inlet and the outlet openings are closed and the valve parts are resiliently compressed (deformed; FIG. 9A). In the intake position, the valve member is forced in the direction of the outlet opening, clearing the inlet opening and further compressing the lower valve part (FIG. 9B). In the dispense position, the valve member is forced in the direction of the inlet opening, clearing the outlet opening and further compressing the upper valve part (FIG. 9C).

In a further variation, instead of operating both valve parts with a single operating element, each part could instead be individually provided with an operating element.

What is claimed is:

1. A dispense valve assembly for a dispenser for fluids comprising:
    a housing having at least an inlet and an outlet and a further opening connected to a pump for drawing fluid into the housing through the inlet and for pumping fluid from the housing through the outlet, the housing being fabricated from a polymer,
    a valve comprising a first part and a second part, the first and second parts of the valve coupled together by a single elastic element and the first and second parts translatably disposed within the housing, the first and second parts of the valve being fabricated from a polymer, the first part of the valve for closing and opening the inlet and the second part of the valve for opening and closing the outlet,
    an operating element extending through a wall of the housing and coupled to the valve,
    wherein the operating element provides at least three positions, a first position wherein the first and second parts of the valve are in resilient bias with the inlet and outlet respectively, a second position wherein the first part of the valve is withdrawn from the inlet and the second part of the valve is in resilient bias with the outlet, and a third position wherein the second part of the valve is withdrawn from the outlet and the first part is in resilient bias with the inlet.

2. The dispense valve assembly according to claim 1, wherein the single elastic element is a helical spring.

3. The dispense valve assembly according to claim 1, wherein a resilient seat is provided at an interface between at least one of the first and second parts of the valves and the opening of the inlet and/or the outlet.

4. The dispense valve assembly according to claim 1, wherein the first and second parts are resilient and a rigid element is positioned between the first and second parts.

5. The dispense valve assembly according claim 4, wherein an overall length of the first and second parts and the rigid element exceeds a length of a cavity defined by the housing.

6. The dispense valve assembly according to claim 1, wherein at least one of the first and second parts and/or an inner wall of the housing is provided with guides supporting translating motion of the first and second parts and defining openings or channels that allow the fluid to flow from the inlet to the pump and from the pump to the outlet.

7. The dispense valve assembly according to claim 1, wherein direction of translation of the first and second parts and of the resilient bias are parallel or aligned and at least substantially normal to an area defined by the inlet and outlet openings.

8. The dispense valve assembly according to claim 1, wherein the further opening is connected to a piston pump.

9. An apparatus for dispensing a plurality of fluids, comprising a support, a plurality of containers for holding a fluid and mounted on the support and a plurality of pumps, each container being connected to the dispense valve assembly according to claim 1 and one of the plurality of the pumps.

10. The apparatus according to claim 9, wherein each pump forms an integral part of one of the valve assemblies and extends at least substantially horizontally.

11. A dispense valve assembly for a dispenser for fluids comprising:
- a housing having at least an inlet and an outlet and a further opening connected to a pump for drawing fluid into the housing through the inlet and for pumping fluid from the housing through the outlet, and
- a valve comprising a first part and a second part, the first and second parts coupled together by an elastic element and the first and second parts of the valve translatably disposed within the housing, the first part for closing and opening the inlet and the second part for opening and closing the outlet,
- an operating element extending through a wall of the housing and coupled to the valve,
- wherein the operating element provides at least three positions, a first position wherein the first and second parts are in resilient bias with the inlet and outlet respectively, a second position wherein the first part is withdrawn from the inlet and the second part is in resilient bias with the outlet, and a third position wherein the second part of the valve member is withdrawn from the outlet and the first part is in resilient bias with the inlet,
- wherein the first part comprises one end that faces the inlet and a remote end that faces the second part, the first part further comprising laterally protruding walls that, during intake of fluid through the inlet, at least partially obstruct fluid flow directly from the inlet to the pump and guide said fluid flow from the inlet, along the first part and past the remote end of the first part before said fluid flow can enter the pump.

12. The apparatus according to claim 11, wherein the second part further comprises one end that faces the remote end of the first part and a remote end that faces the outlet, the second part further comprising laterally protruding walls that at least partially obstruct fluid flow directly from the remote end of the first part to the pump and guide said fluid flow from the remote end of the first part, along the second part and past the remote end of the second part before said fluid flow can enter the pump.

\* \* \* \* \*